(No Model.)
J. W. FLETCHER.
WASHER FASTENER FOR HOSE COUPLINGS, &c.
No. 503,344. Patented Aug. 15, 1893.
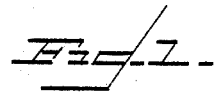
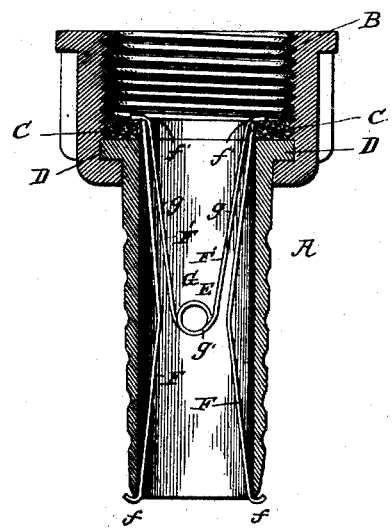
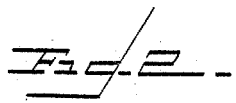 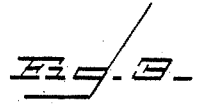
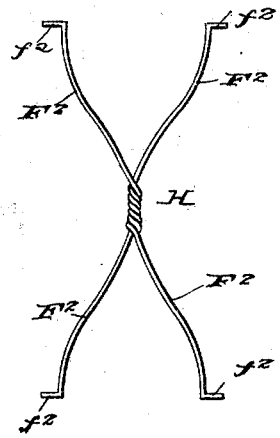 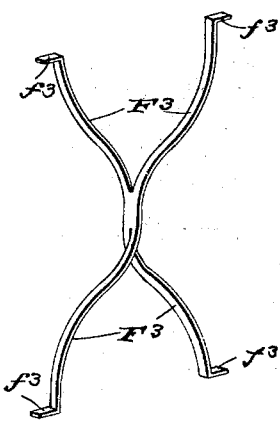
Witnesses
E. K. Stewart
Inventor
James W. Fletcher
By his Attorneys,
C. A. Snow & Co.

UNITED STATES PATENT OFFICE.

JAMES WASHINGTON FLETCHER, OF KNOXVILLE, TENNESSEE.

WASHER-FASTENER FOR HOSE-COUPLINGS, &c.

SPECIFICATION forming part of Letters Patent No. 503,344, dated August 15, 1893.

Application filed October 19, 1892. Serial No. 449,353. (No model.)

*To all whom it may concern:*

Be it known that I, JAMES WASHINGTON FLETCHER, a citizen of the United States, residing at Knoxville, in the county of Knox and State of Tennessee, have invented a new and useful Washer-Fastener for Hose-Couplings and other Tubular Connections, of which the following is a specification.

My invention relates to a washer fastener for use in connection with hose-couplings, &c., the objects in view being to provide a simple, cheap and efficient device whereby the washer may be held in the mouth of a coupling, when the members of the coupling are disconnected, and to provide means whereby said fastener may be attached and detached readily and conveniently, without special adaptation or manipulation of the hose-coupling or connections.

Further objects and advantages of my invention will appear in the following description, and the novel features thereof will be particularly pointed out in the appended claims.

In the drawings: Figure 1 is a view of a fastener, embodying my invention, applied in the operative position to one member of a hose-coupling. Fig. 2 is a view of a slightly modified form of the fastener. Fig. 3 is a view, in perspective, of still another modified form of the fastener.

A represents the tubular member of a hose-coupling, having the revoluble mouth-piece, B, and C represents the washer, fitted within said mouth-piece and resting against the shoulder, D, at one end of the tubular member A.

E represents the fastener, removably adjusted in the tubular body-portion of the coupling, and having the inward extending or diverging spring arms, F F, provided with laterally extending studs or hooks, $f\,f$, at their extremities to engage the inner edge of the coupling body portion, and the oppositely disposed outward extending or diverging spring arms, F' F', provided at their extremities with terminal studs or hooks, $f'\,f'$, to engage the outer opening edges or the outer face of the washer.

In the drawings I have shown different forms of my improved fastener, but each of said devices is provided with duplicate pairs of oppositely extending arms diverging from a common central point, and which are provided with terminal studs or hooks, to engage, respectively, the coupling and the washer. By reason of constructing the washer fastener as described, with duplicate pairs of oppositely disposed diverging spring arms, simple and efficient means are provided for not only firmly holding the washer onto its seat or shoulder, but at the same time for firmly securing the fastener itself within the body of the coupling. It must be apparent that it is impossible for the fastener to work itself out of position from within the tubular body portion of the fastener, owing to the fact that one pair of the spring arms have their terminals hooked onto one edge of the body portion of the coupling, while the terminals of the opposite pair of spring arms clip onto the outer face of the washer, so that the washer cannot possibly be displaced until the fastener is first disengaged from the body portion of the coupling which it engages. The advantage of this construction must be apparent, because a fastening which simply engages the washer would not only be liable to lateral play, so as to allow the washer to shift and slide in coupling and uncoupling, but also would be quite likely to work out of position from the coupling itself. Furthermore, these oppositely extending arms, in all of the modifications of my device, are laterally spring-pressed so as to normally maintain their terminal studs or hooks in engagement, respectively, with the coupling and the washer, but different ways of accomplishing this spring-pressure are illustrated in the several figures.

In Fig. 1 a V-shaped spring, G, having divergent arms, $g\,g$, which are united at their convergent ends by a spring-coil, $g'$, and are integral at their extremities with the upper extremities of the arms, is provided.

In Fig. 2 the oppositely extending arms $F^2$ are formed by two pieces of spring-wire, twisted together at their central intersection, as shown at H, the arms being shaped to form compound curves so as to exert lateral spring pressure and being provided with lateral terminal studs $f^2$.

In Fig. 3 the fastener is struck from a single strip of steel leaf, or other spring material having the proper elasticity, which spring is slitted in opposite directions, beginning at points close to and at opposite sides of the center, and extending to the extremities thereof. These slits form the arms F³, above described, and the adjacent arms are bent laterally in opposite directions, to form compound curves similar to those in Fig. 2, the terminals being bent abruptly to form the studs or hooks to engage the coupling and washer such pairs of arms projecting in opposite directions from a common point of intersection.

The operation and advantages of my invention will be apparent without a detailed description thereof, and it will be readily understood that the fastener may be removed from the coupling and reinserted without difficulty. Furthermore, it will be obvious that by forming the fastener as described, of fine wire, as spring steel, or other material having proper elasticity, the passage of the fluid, through the hose, will be impeded but slightly thereby.

I desire further to state that while I have illustrated three forms of my invention, all of which embody the same principles of construction, and operate precisely alike in all particulars, I do not limit myself to any particular form or forms, reserving the right to alter the same as may be found expedient, within the scope of the invention involved.

Having thus described my invention, what I claim, and desire to secure by Letters Patent, is—

1. A fastener adapted to be arranged longitudinally in the tubular body of a hose coupling, and comprising separate pairs of oppositely disposed duplicate spring arms, each of which arms terminate at their extremities in laterally extending hooks, both pairs of said spring arms diverging from a point intermediate of the ends of the fastener so as to dispose the hooks of both pairs of arms beyond the ends of the tubular body in which the fastener is arranged, one pair of hooks being adapted to be sprung into engagement with the outer face of the washer, and the other pair of hooks into engagement with the opposite end of the tubular body on which the washer is placed, substantially as set forth.

2. A washer fastener formed of a single blank and having separate oppositely disposed duplicate pairs of spring arms, the arms of each pair diverging from a common central point and terminating at their extremities in laterally extending engaging hooks, and a V-shaped spring arranged between one pair of arms and comprising a central spring coil and diverging spring arms extended from the coil and united with the extremities of the pair of arms between which it is arranged, substantially as set forth.

In testimony that I claim the foregoing as my own I have hereto affixed my signature in the presence of two witnesses.

JAMES WASHINGTON FLETCHER.

Witnesses:
E. E. McCROSKEY,
H. M. WILSON.